May 18, 1965 H. WEBER 3,184,229
INTERMITTENT MOTION DRIVE MECHANISM
Filed Aug. 28, 1959 11 Sheets-Sheet 1

INVENTOR:
HANSPETER WEBER
BY Howson & Howson
ATTYS.

May 18, 1965 H. WEBER 3,184,229
INTERMITTENT MOTION DRIVE MECHANISM
Filed Aug. 28, 1959 11 Sheets-Sheet 6

INVENTOR:
HANSPETER WEBER
BY Howson &
Howson
ATTYS.

May 18, 1965 H. WEBER 3,184,229
INTERMITTENT MOTION DRIVE MECHANISM
Filed Aug. 28, 1959 11 Sheets-Sheet 9

INVENTOR:
HANSPETER WEBER
BY
Howson & Howson
ATTYS

FIG. 19.

United States Patent Office 3,184,229
Patented May 18, 1965

3,184,229
INTERMITTENT MOTION DRIVE MECHANISM
Hanspeter Weber, Haddonfield, N.J., assignor to Samuel M. Langston Company, Camden, N.J., a corporation of New Jersey
Filed Aug. 28, 1959, Ser. No. 836,682
9 Claims. (Cl. 271—3)

The present invention relates broadly to an intermittent motion drive mechanism, and more specifically to means for driving mechanism such as a pair of spaced chains intermittently for the purpose of transferring articles to be worked on from one work station to succeeding work stations in timed sequence with work perfoming members.

The mechanism of the present application has particular adaptability for use in machines used for performing operations on sheet material in the flat state, such as a high speed automatically fed platen press used for die cutting, slotting, scoring and embossing of double faced corrugated or solid fiber board of various flute compositions and/or thicknesses.

Even more specifically the present invention is adapted for use in automatically fed platen presses which, as is well-known, require a particular type of work sheet or piece transferring, intermittently from one position to another in timed sequence with the operation of the platen press. For purposes of illustration only, the intermittent motion drive mechanism of the present invention will be described with reference to a platen press of the nature shown in copending patent application S.N. 492,-897, filed March 8, 1955, now Patent No. 3,004,456, and entitled "Machines for Performing Operations on Sheet Materials," assigned to a common assignee with the present application. Only such details of construction of the platen press structure per se will be included herein as are required for an understanding of the present invention and its operation. For details of such a platen press structure, reference is made to said copending patent application.

In most automatically fed platen presses now being manufactured, the method at present used to feed blanks into, through and out of the presses, is to employ a pair of endless chains which carry equally spaced cross bars on which are mounted grippers at spaced intervals across the length of the bars. These endless chains travel, one on each side of the platen work area and between the upright supports of the press. A plurality of grippers are used which, when suitably mounted at spaced intervals on cross bars, which are in turn equally spaced and connected on each end to the endless chains, and the chains are placed in motion intermittently move the gripper carrying bars which execute a motion of translation. As so arranged, they are capable of transferring a sheet or blank from one position to another, such as for example, from a feeding station into one or more work stations successively, and then into a station where the sheet or blank is discharged onto a stack or take-away conveyor.

The known grippers are designed to clamp the leading edge of the sheet material at the feed end of the machine, pull the blank or sheet through one or more work stations successively, and finally transfer it to the discharge station where a mechanism opens the grippers for discharging the blank onto a stack or a take-away conveyor. This necessitates placing the chains in motion intermittently so as to transfer the blank or sheet from one station to another in timed relationship with the work stroke of the press platen. The arrangement and movement of the pair of chains is such that at each standstill, a gripper bar is in a position such that the grippers can seize the leading edge of the blank or sheet pushed forward a short distance automatically by a kicker feed or the like, one at a time, either from the bottom of a stack of sheets in a feed hopper utilizing guides which are adjustable to accommodate various size blanks, or a top feed mechanism in which the blanks are fed from the top of a progressively ascending stack to the grippers. At each standstill of the chains during intermittent motion thereof, the next succeeding bars on the chains are in positions such that the blanks or sheets are in one or more successive work stations. Likewise, at each standstill of the chains, a bar at the discharge station carries a sheet which has been worked on in a previous station, and where the sheet is disconnected from the gripper devices and dropped or discharged, one on top of another in an orderly stack, or can be dropped on a take-away conveyor. Various of the bars carried by the endless chains are in idle positions around the drive or take-up sprockets or on the return chains. It is customary in the art to pull the flat blanks or sheets through the machine by the leading edge which is adapted to be trimmed, with the trimmed material later scrapped.

In usual practice, a plurality of grippers are spaced at intervals across the length of the cross bars, and various types of jaws have been utilized in an attempt to insure a more positive grip. A new and novel type of blank or sheet gripper is disclosed in the present application, which gripper is the joint invention of the present applicant and Henry W. Moser, and which is claimed in a copending application S.N. 827,658, filed July 16, 1959, now Patent No. 3,162,682, and assigned to a common assignee herewith. Only such details of this improved and novel gripper will be shown and described herein, as is necessitated for a understanding of the present invention.

In most automatic platen press designs heretofore known, it has been customary for the endless chains to return over the top of the platen press. The intermittent motion for indexing such endless chains in existing platen presses, and other type machines requiring this particular type of work piece or sheet transferring, is usually provided by mechanisms including such as a Geneva wheel or other conventional intermittent motion indexing device; a crank operated reciprocating segment driving a pinion on the endless chain sprockets shaft; and a crank operated reciprocating rack driving a pinion on the endless chain sprockets shaft. In the latter two of the mentioned types, an overrunning clutch provides feeding in one direction and free-wheeling on the return stroke.

Heretofore known types of intermittent motion drive mechanisms have not been entirely satisfactory for various reasons. Many have difficulties in achieving precision positioning at high speeds because of inertia and momentum of the moving masses, which oppose the necessarily rapid succession of moving and stopping cycles, and are not susceptible of varying the time cycle of movement without changing the entire cycle of the machine. The rate of acceleration and deceleration of these machines cannot be varied without changing the entire mchanism or the time cycle of the entire machine. Slip clutches, shear pins, or the like must also be provided in the known machines to provide for overload protection in cases of malfunctions or jams, and electrical interlocking devices or other means must be used for stopping the motion of the press platen in such cases of feed malfunctions or jams. Even with these provisions it may not be possible under certain circumstances to stop the machine in time to prevent damage.

It is accordingly a primary object of the present invention to provide an improved type of intermittent motion drive mechanism which has no difficulty in achieving precision positioning at high speeds or for short time cycles, and in which the time cycle of intermittent movement and standstill can be easily and quickly varied without changing the entire time cycle of the machine.

It is a further object of the present invention to provide a new and improved intermittent motion drive mechanism wherein the rate of acceleration and deceleration can each be varied independently without changing the over-all time cycle of the machine such as may be required when feeding a large or heavy sheet or blank. For this purpose, the time cycle of the feed and transfer can be decreased while the down and up positions times of the platen cycle can remain the same.

Another object of the present invention is to provide such a mechanism in which the necessity for a slip clutch or shear pin or the like is obviated for overload protection, nor are interlocking devices or throw out clutches required to stop the motion of the press platen in cases of malfunctions or jams in the feeding or transferring of the blanks or sheets since, according to the invention, the platen does not operate until the blanks or sheets are in proper positions.

An additional object of the invention is to provide an improved intermittent motion drive mechanism consisting of a fluid powered motor with electrically and cam controlled fluid control valves which will start, index a turret, pair of chains, conveyor or the like and then stop it automatically in timed relationship with the work stroke of the machine.

Additional objects and advantages of the present invention will be more readily apparent from the following detailed description of an embodiment thereof when taken together with the accompanying drawings in which.

Referring now to the various figures of the drawings, like reference characters are applied to similar parts thereof.

Considering the machine in terms of function and with reference to the primary component elements and their respective functions, work sheets 20 from which in the present instance box blanks are to be formed, are stacked upon a feed table 22. Associated with the table and functioning to maintain the stack 24 accurately in predetermined position on the table is a back stop 26 adjustable in a known manner, which engages the rear of the stack, side guides 28, which confine the opposite sides of the stack, and front stops 30 which can be so adjusted in a known manner to accommodate desired sizes of sheets and that the gap between the lower edges thereof and the confronting surface of the feed table is just sufficient for passage of only one of the sheets 20 at a time.

Figures 1, 2A:
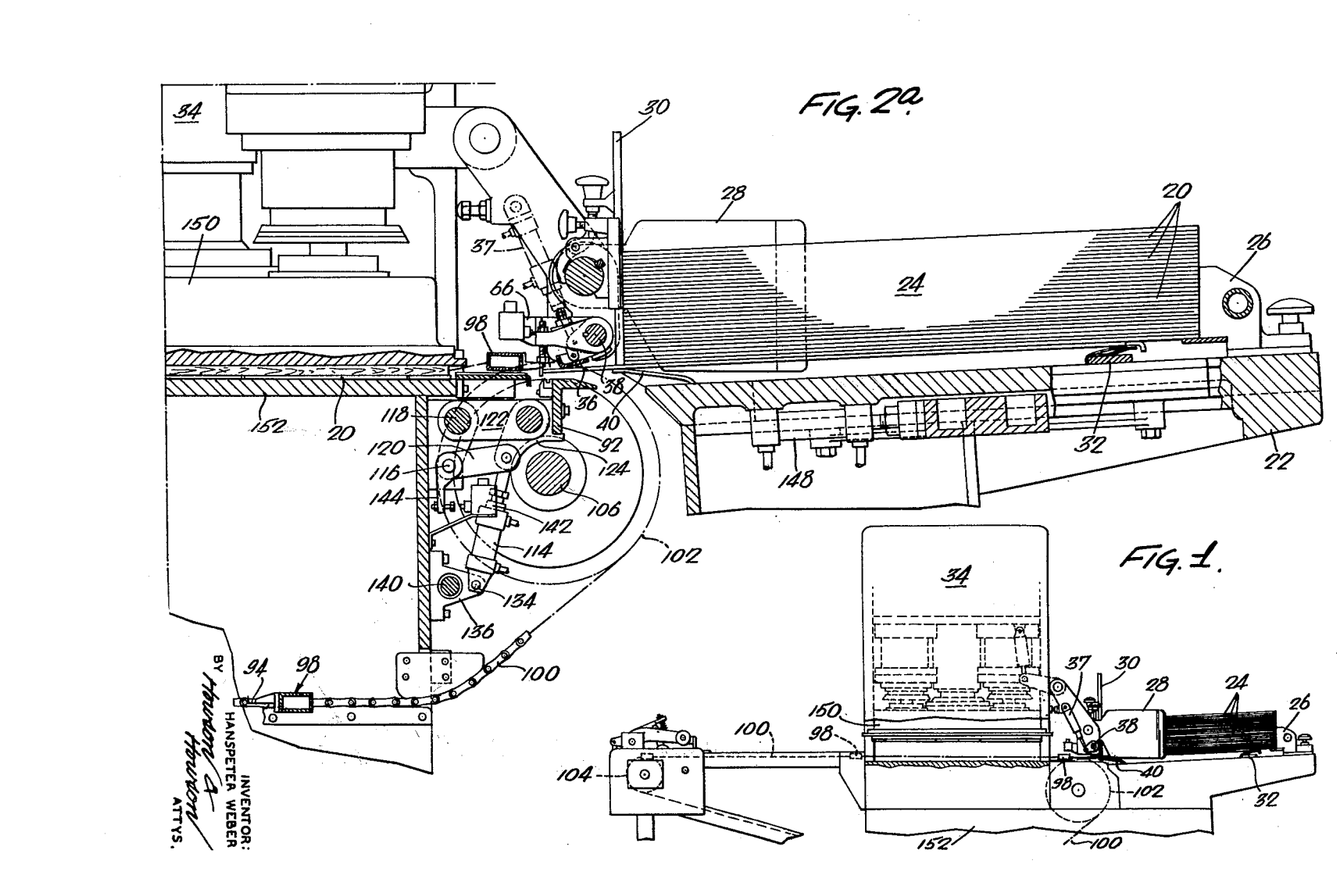
FIG. 1 is a fragmentary schematic view of an automatic platen press incorporating the intermittent drive mechanism of the present invention.
FIG. 2a is a fragmentary side elevational view, partly in section, of the input end of a high speed automatically fed press platen.

The sheets 20 are fed from the bottom of the stack by means of a feed bar broadly indicated 32 which has a limited reciprocation between the rear edge of the stack and a point short of the front stops 30. The sheets 20 are fed by the bar 32 forwardly in the direction of the platen press generally designated 34. Here a deflector mechanism generally designated 36, including a plurality of components transversely spaced on a register gate shaft 38, and in the present embodiment consisting of three components as will appear hereinafter, deflect the leading edge of the sheet downwardly to a certain extent so that the leading edge will not catch on the hooks hereinafter referred to. A guide member 40 mounted at the rear end of feed table 22 supports the lowermost ones of the sheets as will be seen from FIG. 2a of the drawings. The sheets are pushed by feed bar 32 into registry with a register gate 42. Deflector plates 44 and 46 in the deflector mechanism 36, serve to guide the sheet and deflect it downwardly. Segmental deflector plates 46 serve to catch warped sheets. A continuous deflector plate 44 is carried by arms 45 rotatable on shaft 38 and is spring loaded by coil springs 48 of interconnecting means for arm 45 and arm 47 fixed on shaft 38. Arm 45 can be rotated on shaft 38 approximately 10° by compressing the springs 48.

Figure 4:
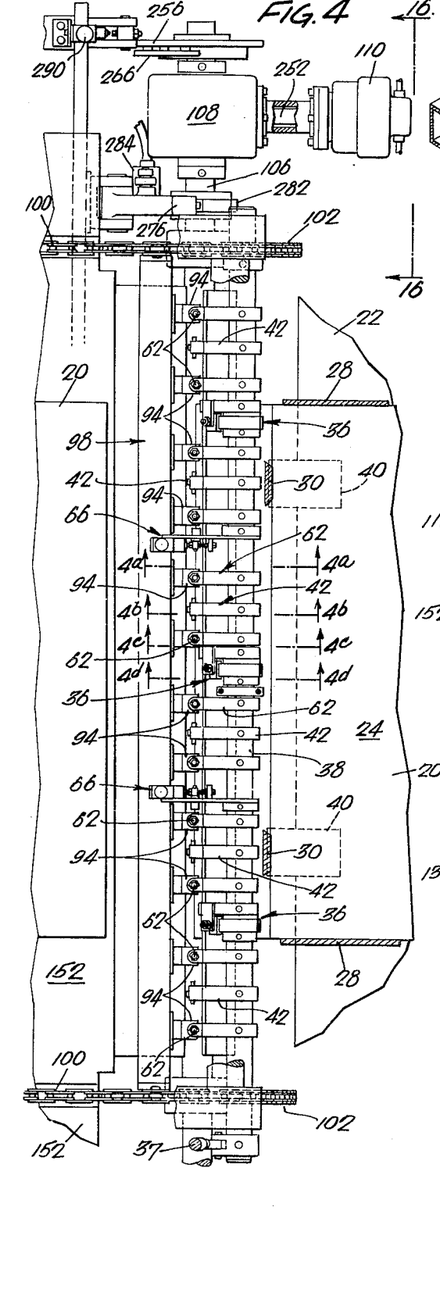
FIG. 4 is a fragmentary top plan view of portions of the feed mechanism taken on line 4—4 of FIG. 3.

The register gate 42 consists of a plurality of individual plates 50 secured to mounting brackets 52 which are spaced on shaft 38 and keyed thereto at 56. These individual register gate plates are adapted for spacing in between the hooks as will appear hereinafter. The gates can be made adjustable with the direction and against the direction of sheet travel to change the position of the sheet. This construction is shown in FIG. 4b of the drawings wherein the plates 50 are secured to the brackets 52 by bolts 54 or the like. In the present embodiment, six of the register gates are spaced along shaft 38.

Figure 4A:
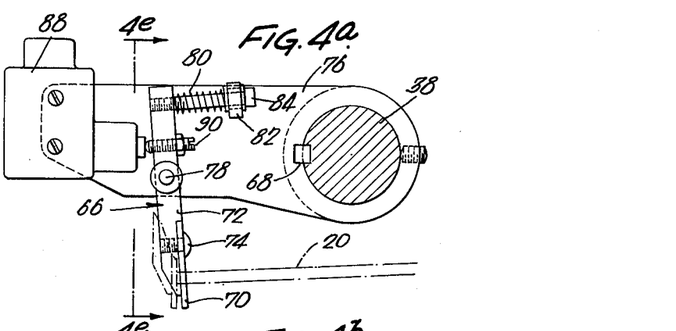
FIGS. 4a–4d respectively are enlarged sectional views taken on lines 4a–4d of FIG. 4.
Figure 4B:
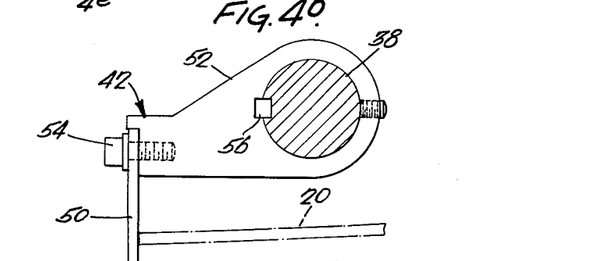
Figure 4C:
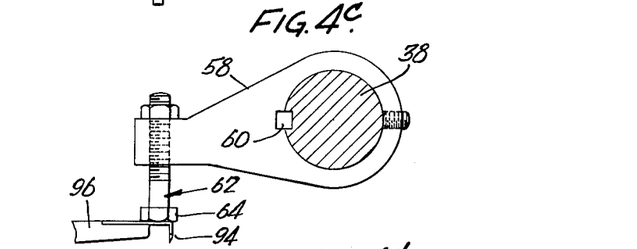
Figure 4D:
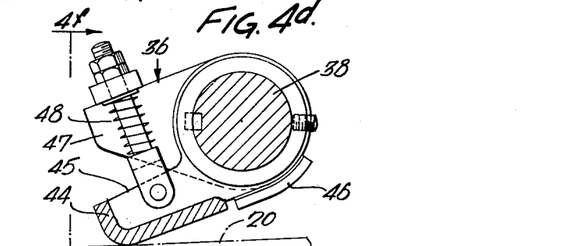
Figure 4E:
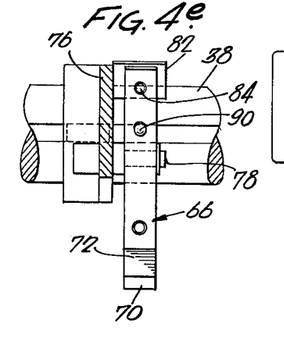
FIGS. 4e and 4f are sectional views taken on lines 4e–4f of FIGS. 4a–4d respectively.
Figure 4F:
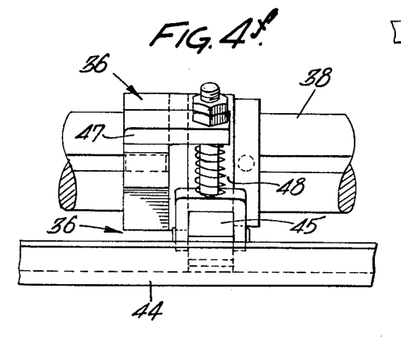
Figure 5:
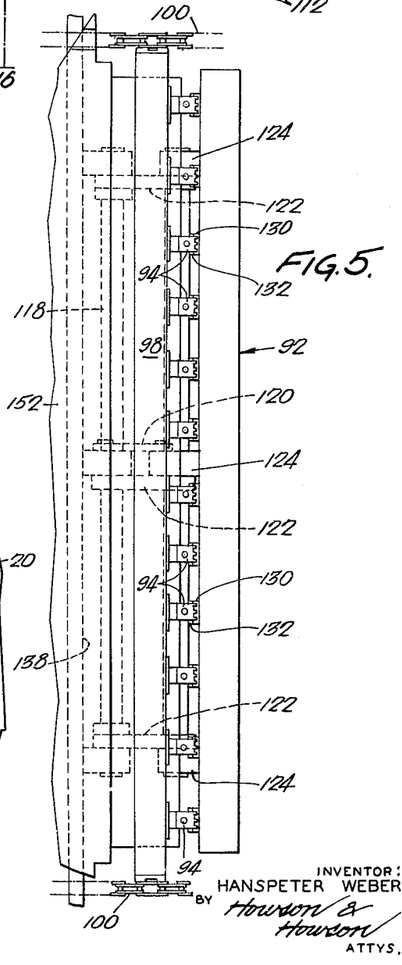
FIG. 5 is a view similar to FIG. 4 taken on line 5—5 of FIG. 3.

Also spaced along the shaft 38 are a plurality of brackets 58 keyed thereto at 60 as shown in FIG. 4c and each carrying a hook support 62. These hook supports 62 are spaced evenly with the hooks and each of the spaced hooks is backed by the head of a bolt 64 for purposes to appear hereinafter. In the apparatus shown, twelve of the brackets 58 and hook supports are spaced evenly across the length of shaft 38 and interspersed with the other members carried thereby.

Two sensing devices broadly designated at 66 are also mounted on shaft 38 and keyed thereto at 68, as shown in detail in FIG. 4a. These sensing devices 66 are evenly spaced and close enough so that the minimum width sheet will actuate lever plates 70 carried on lever arms 72 by screws or the like 74 at their lower ends. The levers 72 are pivotally mounted on brackets 76 constituting the support means for the lever arms and lever plates and which brackets are keyed to the shafts 38 as mentioned. The levers 72 are pivotally mounted at 78. A spring 80 is mounted on bracket 76 at 82 on bolt 84 with its forward end passing through lever 72 as shown in FIG. 4a. The spring 80 is adapted for maintaining the lever 72 and associated lever plate 70 in forward position, indicated by full lines at 86. The positioning of the lever 72 can be adjusted by means of adjusting bolt 84 in an obvious manner. A switch 88 is adapted for actuation by an adjustable screw 90.

Figure 7:
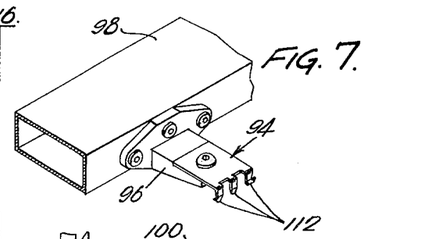
FIG. 7 is a fragmentary perspective view of a portion of a feeder bar and a blank or sheet gripper secured thereto.

In operation, the motions of the kicker feed and register gate shaft are so controlled that the register gate and all the other devices carried by the shaft will be in working position before a sheet is fed in completely. When a sheet is advanced to the register gate which positions it accurately, the two sensing devices give a signal to actuate a pusher bar 92 in an upward direction. This pusher bar and the operating mechanism therefor which will be described hereinafter, is for the purpose of impaling the leading edges of the work sheets 20 on hooks 94, mounted by brackets 96 on feeder bars 98 (FIG. 7). These feeder bars extend transversely of the apparatus in longitudinally spaced array and are secured for movement by spaced parallel endless chains 100 entrained around sprocket wheels 102 at the forward end of the machine and 104 at the delivery end of the machine. The sprocket wheels 102 are mounted on a conveyor drive shaft 106 adapted for driving through transmission 108 from a hydraulic drive motor 110 having suitable controls for the operation thereof.

The improved type of work sheet grippers as set forth in detail in the said aforementioned patent application includes a plurality of tines or prongs 112, preferably sharpened in one or more directions and bent at a right angle to the direction of pulling the blank or sheet through the machine. One or more of the tines can be provided with barbs on one or more sides or edges, to insure a more positive seizure of the sheet or blank after it has been pierced and penetrated. These tines or barbs are adapted to penetrate completely through the work sheet and give a positive drawing action thereto. They are susceptible of easy replacement and are capable of feeding warped and distorted blanks and sheets equally as well as flat blanks and sheets. The grippers or hooks can easily be replaced by members of the same general type but of a different design which will grip the blank or sheet a greater or smaller distance from the leading edge with more or fewer prongs, if desired or required.

The pusher bar mechanism is actuated by hydraulic cylinder 114 which is controlled by a solenoid valve which will be described in connection with the hydraulic and electrical circuit hereinafter. A lever arrangement consists of fixed bearings 116 and 118 suitably mounted in the frame work of the mechanism and links 120 and 122, so designed that the upward motion of the pusher bar 92 which is mounted on brackets 124 by bolts 126 on shaft 128 is vertical. Opposite the barbs 112 is a wooden insert 130 held in position by a clamp 132 to permit proper insertion of the barbs through the work piece and this wooden piece or insert is grooved to facilitate such entrance.

The hydraulic cylinder 114 is pivotally mounted at 134 at its lower end to bracket 136 suitably secured to a vertical member 138. A plate lift shaft 140 passes through bracket 136 but this construction forms no part of the present invention. The deflector mechanism generally indicated 36 which guides the sheets into proper position is adapted to be pushed up during the engaging operation when the pusher bar 92 moves upwardly, since the deflector 44 is free to rotate on shaft 38, being held down only by the springs 48. As the pusher bar 92 completes its upward movement, a limit switch 142 is actuated by lever 144 carried on bearing 116 and which is adjustable through the medium of set screw 146. When the limit switch 142 is actuated, the register gate shaft 38 is adapted for retraction and the kicker feed 32, operable through hydraulic cylinder means generally indicated at 148, is returned to its neutral position. While the register gate shaft 38 is retracted, the sensing devices 66 move away from the leading edge of the sheet and lever arms 72 are returned to normal position by springs 80, tripping the limit switch 88. This signal is utilized to return the pusher bar 92 to its downward position. When the pusher bar 92 returns, the limit switch 142 is released which permits indexing mechanism to operate providing that all other interlocks which may be provided in the apparatus are cleared. Timing or synchronization of all the motions described hereinabove and hereinbelow can, if desired, be done by time delay relays, or by a cam shaft actuated by a hydraulic motor means controlling cam operated hydraulic valves which in turn control the hydraulic cylinder which actuates the various devices.

Figure 12:
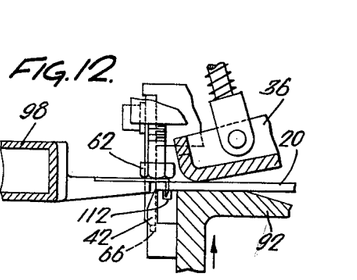

Referring to FIGS. 10–13, operation of the impaling means will be understood. A hydraulic cylinder 37 is operatively connected to the deflector mechanism 36 and associated parts. This hydraulic cylinder is operable when actuated to move the deflector mechanism angularly upwardly. When sensing devices 66 are depressed by contact of the sheets 20 therewith, the initial contact being shown in FIG. 10, and the depressed relation shown in FIG. 11, switch 88 will be closed. This actuates cylinder 114 which raises the pusher bar 92 and the sheets are thereby impaled on hooks (FIG. 12). Movement of the cylinder rod causes rotation of lever 144 and limit switch 142 is thereby closed. This in turn causes actuation of hydraulic cylinder 37 to raise the register gates, sensing devices and deflector mechanism to the position shown in FIG. 13, and the cycle as explained above is initiated.

Following the described actuation of the pusher bar mechanism 92, which serves to impale the leading edge of a working sheet or piece 20 on the barbs or tines attached to the feeder bars, and when the apparatus is properly indexed, the sheet will be drawn from its position of registration with the register gates into and under the movable platen 150, movably superimposed over platen bed or base 152. The cycle of operations will then stop movement of the chains and feeder bars with the work sheets in proper registry with the platen members. Subsequently, the upper platen member will lower and effect the desired and required working on the work sheet. Following this the upper platen member will raise and in so doing the indexing mechanism will again be actuated so that the chains are again driven forwardly taking therewith the work sheet or piece which has been acted on in the platen press. The chains will continue to move until such time that a feeder bar carrying the so worked on sheet arrives and comes to a complete stop at the delivery station of the machine shown in detail in FIGS. 8 and 9 of the drawings wherein the sheet is adapted for being removed from the carrying barbs or tines and discharged as desired into a stack or delivery conveyor means therefrom. The mechanism at the delivery end for effecting discharge of the worked on sheets will be defined hereinafter.

Figures 2B, 2C, 2D, 21:
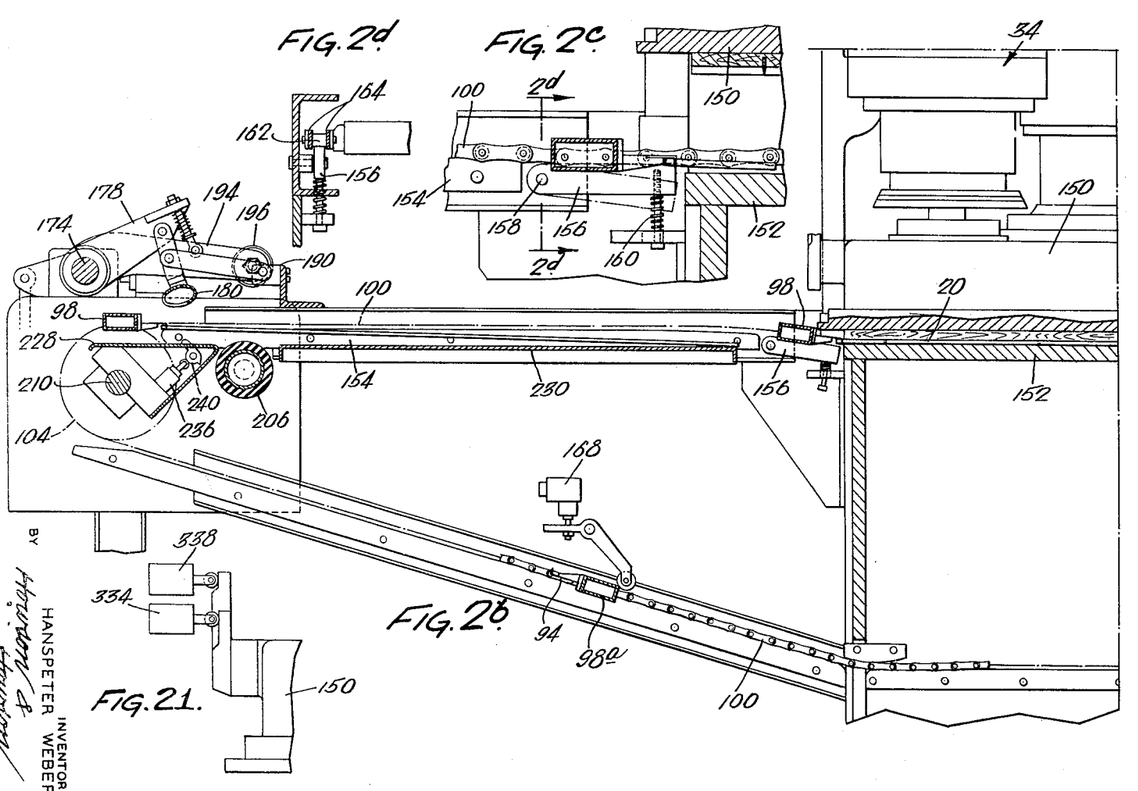
FIG. 2b is a view similar to FIG. 2a of the work discharge end of such a machine.
FIG. 2c is a fragmentary view of guide means for the chain.
FIG. 2d is a fragmentary sectional view taken on line 2d—2d of FIG. 2c.
FIG. 21 is an enlarged fragmentary view of a portion of the platen table and switches operable thereby.
Figures 3, 6:
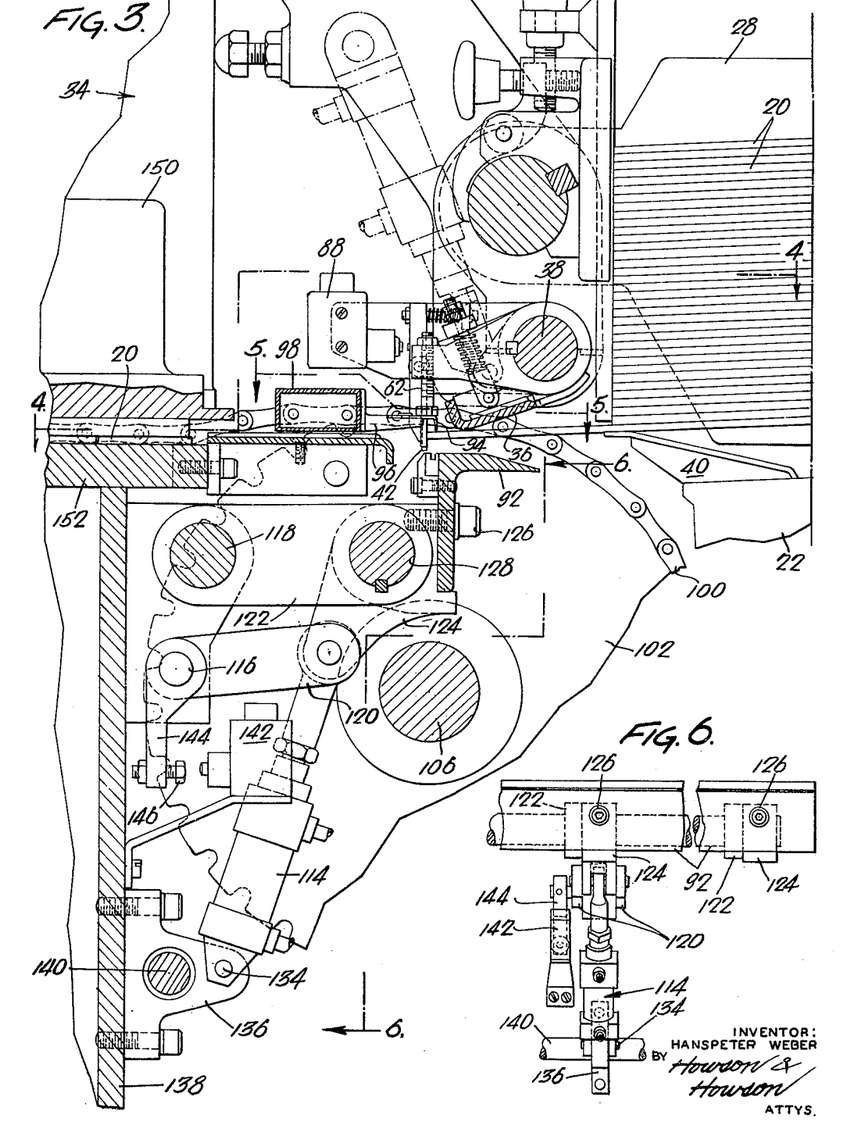
FIG. 3 is a fragmentary enlarged elevational view, partly in section, of the input end of the machine showing details of the intermittent feed mechanism for the blanks or sheets.
FIG. 6 is a fragmentary front elevational view taken on line 6—6 of FIG. 3 to a reduced scale.

It will be noted that during the course of travel, the chains 100 are completely supported throughout their entire course by means of plates 154 which can be of channel shape or otherwise as desired and well-known in the art. The return run of the chains is below the platen press and externally of the lateral dimensions thereof, consequently completely freeing the upper part of the mechanism for repairs and/or access. Referring to FIG. 2b of the drawings, it will be noted that the chains, being flexible, are depressed or curved downwardly when the upper platen member 150 moves to its lowermost working position. Interposed between the discharge end of the platen press and the remaining run chain there is a pivoted arm 156 under each run of the chain, pivoted at 158, adapted for raising the chains and feeder bars attached thereto carrying the worked on sheets to their normal position with respect to their entrance elevation in the platen press. These guide members 156 have adjustable stop means 160 to limit their uppermost angular position.

FIG. 2c shows the pivoted arm 156 in raised or horizontal position with the movable platen 150 moved upwardly away from the platen base or bed 152, and the chains have been permitted to raise from their depressed position to their normal horizontal flight.

FIG. 2d is a cross sectional view taken on line 2d—2d of FIG. 2c showing the guiding relationship of the pivoted arm 156 contacting the lower portions of the chain links 162 intermediate the chain end plates 164 operable in an obvious manner.

Figures 8, 14:
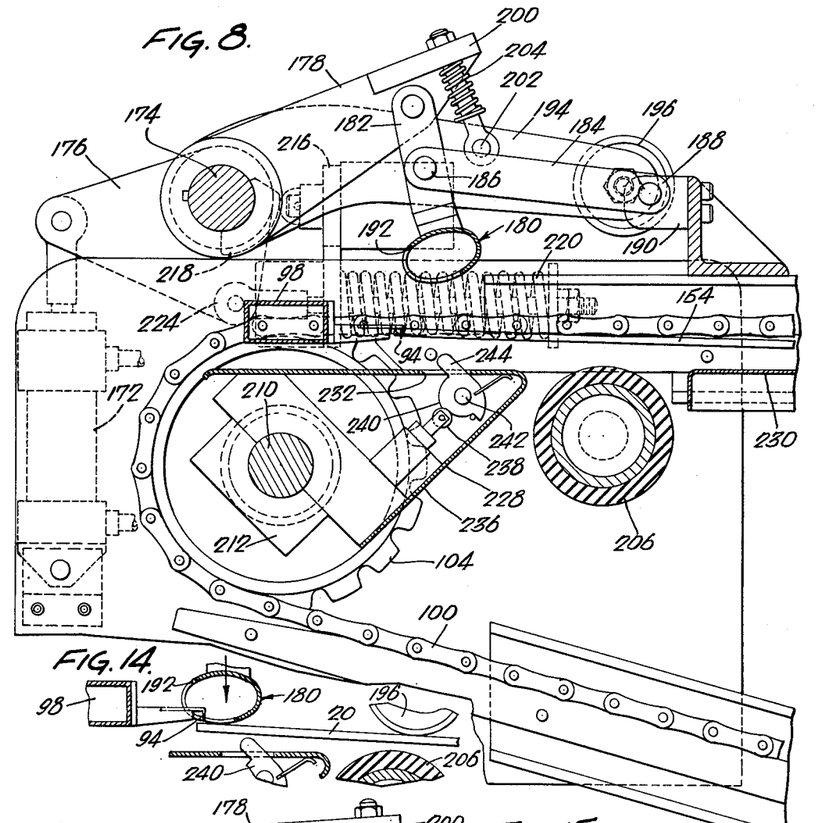
FIG. 8 is an enlarged fragmentary view in elevation and partly in section of constructional details at the sheet discharge end of the mechanism.
FIGS. 14 and 15 are enlarged schematic sectional views of the mechanism at the discharge end of the machine showing a successive sequence of operational phases thereof.
Figure 9:
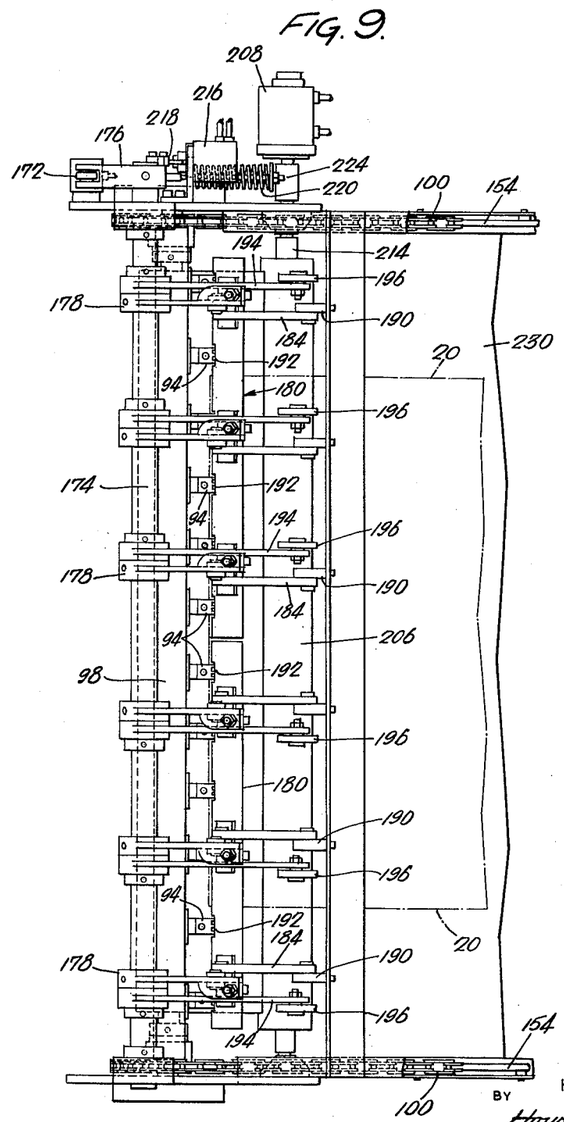
FIG. 9 is a fragmentary top plan view of that portion of the mechanism shown in FIG. 8.
Figure 10:
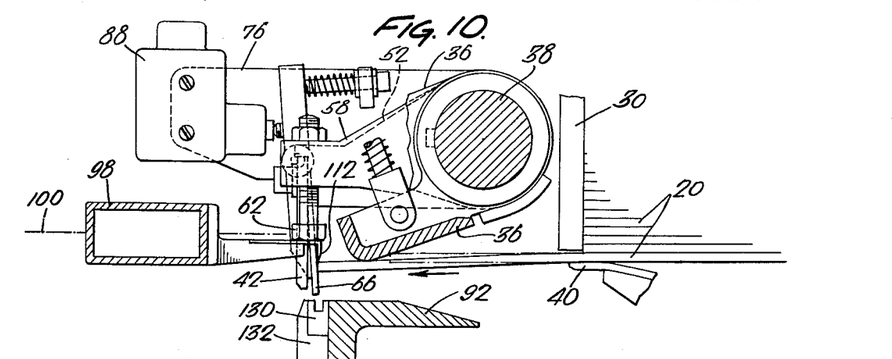
FIGS. 10, 11, 12, and 13 are schematic sectional views of sheet input operating mechanism at the sheet input end, showing successive operational phases thereof during intermittent drive of the mechanism.
Figure 11:
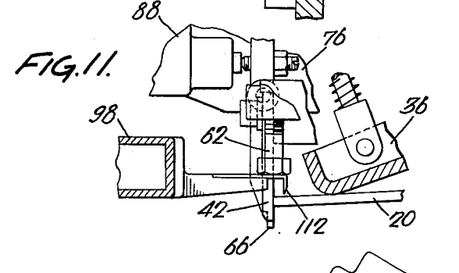

FIGS. 2b, 8, 14 and 15 are here referred to with reference to a description of the discharge or delivery end of the mechanism in cross sectional or elevational view, and FIG. 9 is a top plan view of this portion of the machine. It will be seen that the sheets or work pieces 20 impaled on the tines or prongs 112 are raised at their leading edge as they are pulled through the machine following the working operation at the platen press. When the feeder bar 98 arrives and comes to a complete stop at the delivery station of the machine, the cut sheet is discarded. At this point feeder bar 98a contacts and trips a limit switch 168 which in turn energizes solenoid valve 170 which controls cylinder 172. The cylinder 172 operates to rotate shaft 174 through lever 176, which in turn rotates arms 178 which are affixed to shaft 174 for rotation therewith and spaced across the transverse axis of this shaft. A plurality of ejector bars 180 are each secured to the arms 178 by means of brackets 182 pivotally connected to arms 178 at their upper ends. Levers 184 are pivotally connected at one end 186 to brackets 182, and their opposite ends 188 are pivotally connected to a stationary bracket 190.

The ejector bars 180 which are substantially elliptical in shape have cut-out portions 192 of size and a shape to permit their passage around or over the hooks 94, as shown in FIG. 14, for the purpose of permitting removal of the work sheets or pieces 20 from these hooks during discharge or delivery of the sheets at the delivery end. During operation it will be noted that the motion of the ejector bars 180 will be vertical when these bars contact the sheets 20 to eject it from the hooks 94 due to the relationship and operation of arms 178, levers 184 and brackets 182 on which the ejector bars 180 are mounted.

A plurality of arms 194 are mounted for free rotation on shaft 174 and at their free ends, each carry a roller 196. Motion of the arms 194 is controlled by arms 178 in conjuction with an eye bolt having one end secured through bracket 200 on arm 178, with the other end pivotally mounted at 202 on arms 194. A coil spring 204 surrounds eye bolt 198 and is interposed between bracket 200 and levers 184 and arms 194. Motion of the arm 194 is controlled by the arm 178, the eye bolt 198 and the coil spring 204. Actuation will be initiated by arm 178 upon rotation of shaft 174, and the utilization of the coil springs 204 eliminates the necessity of adjusting this arm for different thickness of feed material. As the ejector bars 180 move from the position shown in FIG. 8 to that shown in FIG. 14, they will push or eject the work sheets 20 from the hooks 94 and disconnect them from the tines or barbs thereon in a positive manner as indicated in FIG. 14. After the sheets are ejected, the rollers 196 will, due to motion of arms 194 downwardly, push the sheets onto a delivery roll 206. The delivery roll 206 is adapted for driving by hydraulic motor 208. The sprocket wheels 104 at the delivery end of the machine are splined onto delivery end shaft 210 mounted in bearing trunnions 212.

The delivery roll 206 is mounted on shaft 214 operatively connected with hydraulic motor 208 as seen from FIG. 9 of the drawings. Hydraulic motor 208 is controlled by cam valve 216 which is actuated by cam 218. Cam 218 is mounted on shaft 174 so that when cylinder 172 is actuated to eject a sheet, the cam valve 216 is operated by cam 218 which starts up hydraulic motor 208 thereby rotating shaft 214 together with delivery roll 206. A coil spring 220 operatively connected to eye bolt 224 having one end connected to lever 176 serves as a cushioning and return means for the shaft 174 to thereby inactivate cam valve 216 to stop operation of delivery roll 206 as will appear hereinafter. The sheet which is ejected is thereby brought up to speed by the delivery roll 206 with the top surface of the sheet being contacted by rollers 196 to cause a frictional engagement between the two rollers and the sheet is then delivered to a take-off table or a conveyor. The speed of delivery roll 206 can be controlled by a flow control valve which will be described hereinafter with reference to the hydraulic circuit.

It will be noted that the cam valve 216 is preferably a cam operated four-way valve and the flow control valve for controlling speed of operation of hydraulic motor 208 is broadly designated 226.

Figure 15:
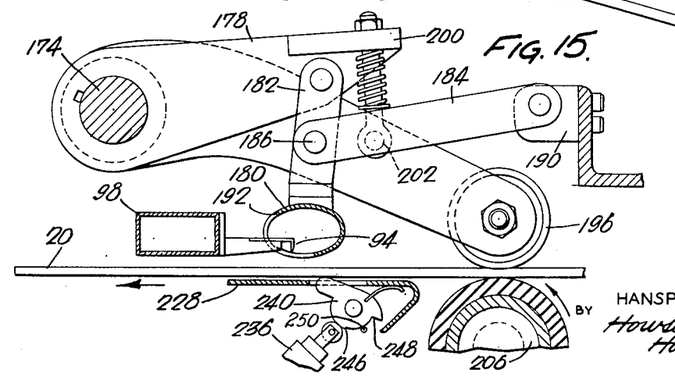

At this delivery end station, a triangular shaped bracket member 228 is secured to trunnion 212 in fixed position with the upper surface thereof at substantially the same level as the table 230 for supporting the work sheets after ejection from the hooks. An opening 232 is provided in the top surface of the member 228. A micro-switch 236 having a roller 238 on the free end of the lever thereof is adapted for coaction with a rotatably supported cam 240 mounted on shaft 242. The cam 240 has a nose portion 244 adapted to extend through the opening 232 until engaged by a sheet passing thereover when it is depressed as shown in FIG. 15. Steps 246 and 248 are provided in the cam surface as also shown in FIG. 15, with the step 246 adapted for engagement with roller 238 and the step 248 adapted for engagement with a stop 250. The cam 240 is spring biassed to the up position shown in FIG. 14 wherein the step engages with the stop 250 to limit its upward movement. When depressed, by engagement of a sheet with the nose portion 244, the cam will actuate the micro-switch 236. If, however, the sheet is improperly presented or not presented to the cam 240 during the normal cycle of operation or sequence of operations of the apparatus, the micro-switch acts to deenergize the entire apparatus for safety purposes.

Figure 16:
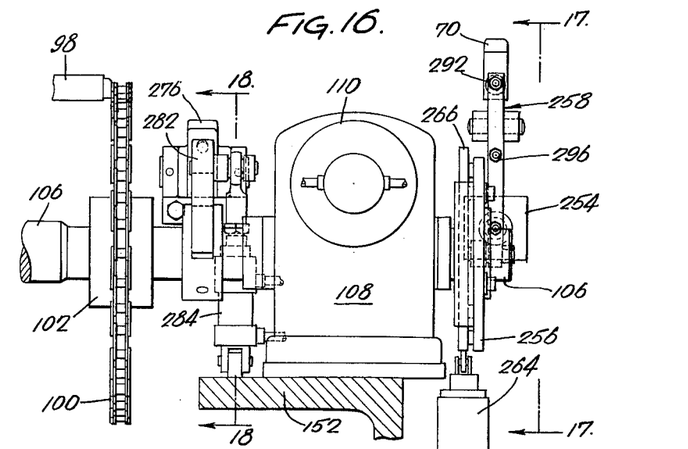
FIG. 16 is a fragmentary front elevational view taken on line 16—16 of FIG. 4.
Figures 17, 18:
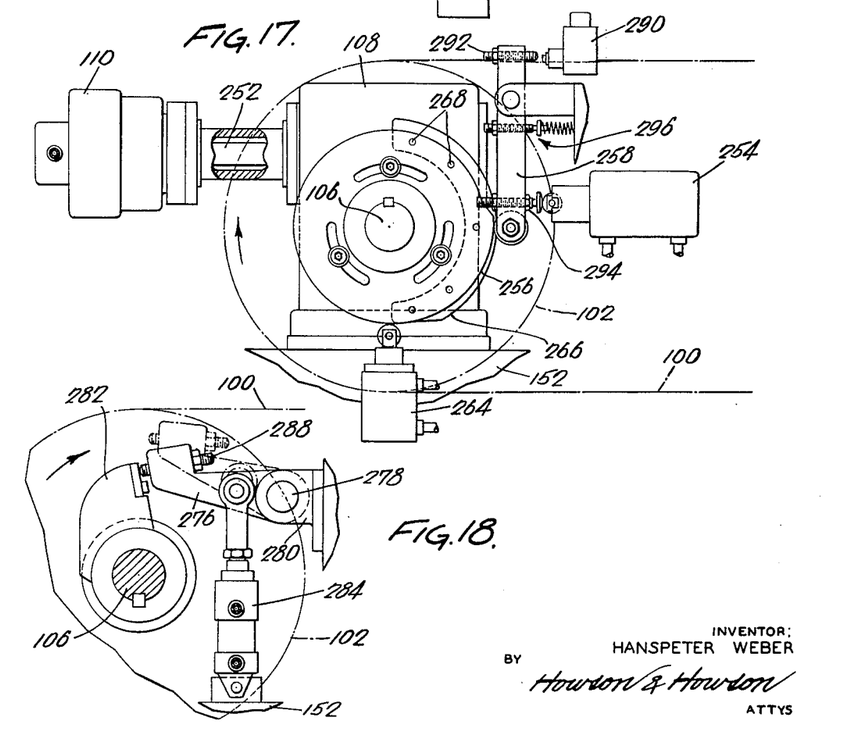
FIG. 17 is a fragmentary side elevational view taken on line 17—17 of FIG. 16.
FIG. 18 is a fragmentary view, partly in section, taken on line 18—18 of FIG. 16.

Referring to FIGS. 16–18 inclusive, the indexing drive and operation of the mechanism will be explained. As pointed out hereinbefore, two sprocket wheels 102 are mounted on conveyor drive shaft 106 to drive the two endless chains 100 to which the feeder bars 98 are attached. The shaft 106 is driven by a gear reducer transmission 108 with the input shaft thereof 252 (see FIG. 4) connected to hydraulic motor 110. The hydraulic motor 110 is controlled by a number of hydraulic valves which in turn are controlled by cams.

The sprockets 102 are dimensioned in such a manner that the circumference of the sprocket at the pitch diameter is equal to one indexing motion or movement. Consequently the drive shaft 106 will always complete one revolution to advance the feeder bars 98 one full pitch or step. A cam operated valve 254 is used to control hydraulic motor 110. This cam operated valve 254 is actuated indirectly by cam 256 through an adjustable lever arrangement broadly designated 258. Cam 256 is mounted on and keyed to drive shaft 106. The cam 256 is so designed that full flow is permitted through cam valve 254 during acceleration of the mechanism. To control deceleration thereof, the cam 256 operates to gradually close the cam valve 254. Inlet flow to as well as outlet flow from hydraulic motor 110 is controlled by cam valve 254. Under certain circumstances it is desirable and necessary to be able to change the rate of acceleration of the mechanism for which purpose a pressure reducing valve 260 is mounted in the pressure line to the cam valve 254. An adjusting knob is provided at pressure reducing valve 260 whereby the oil pressure to the cam valve 254, and accordingly hydraulic motor 110, can be reduced to any desired magnitude. If desired, a remote control valve can be used to effect this pressure adjustment at a convenient location. The pressure reducing valve 260 can be used to limit maximum pressure to the motor 110 in an obvious manner.

A solenoid operated valve 262 is incorporated in the hydraulic system to permit instantly reducing the pressure to zero when the machine is stopped. This solenoid operated valve 262 is connected to the pilot port of pressure reducing valve 260, and when energized has the same effect as setting the remote control valve referred to hereinabove to zero pressure. A cam operated valve 264 is used for the purpose of decreasing the oil pressure during deceleration of each indexing motion. This cam operated valve 264 is controlled by a cam 266, attached to cam 256, by means of bolts or the like 268. It will be noted from FIG. 17 of the drawings, that the cam 266 is a segmental one since it is required only for operation during certain cycles of the machine and means are provided for adjusting cam 266. A check valve 270 is inserted in the hydraulic circuit to protect the motor 110 from receiving over pressure while the cam valve 254 is gradually closed. This check valve 270 interconnects the outlet port of the hydraulic motor 110 with the pressure circuit. Accordingly, if pressure builds up beyond the pressure in the circuit, oil will then be discharged to the circuit thereby limiting the maximum pressure on the outlet port of drive motor 110 to that of the accumulator in the circuit.

Needle valves 272 and 274 are incorporated in the hydraulic circuit for controlling the drive motor 110 when the cam operated valve 254 is closed completely. Of these, valve 272 supplies oil to the motor to bring the indexing into its final position as well as to start the indexing motion. Valve 274 is operable to control the velocity at which the indexing is finally stopped, with the indexing arm 276 pivotally mounted at 278 on bracket 280, in conjunction with indexing stop 282 keyed onto drive shaft 106.

The indexing arm 276 is actuated by hydraulic cylinder 284 which in turn is controlled by solenoid operated valve 286.

Repositioning of the feeder bars 98 and chains 100 can be accomplished by adjusting screw 288 which controls position of indexing stop 282 with respect to arm 276.

The rod side of cylinder 284 is under pressure at all times which acts to return the indexing arm 276 to the full line position shown in FIG. 18 as soon as the head pressure is released by solenoid operated valve 286, for safety purposes.

When cutting of a work sheet or piece 20 has been completed, a signal is given to valve 286 which applies pressure to the bottom or piston side of cylinder 284. The indexing arm 276 is thereby raised to the dotted line position of FIG. 18, and main drive shaft 106 will commence to rotate.

During this rotation, a signal from limit switch 290 serves to reset cylinder 284 and indexing arm 276 is lowered thereby to stop and position shaft 106. Limit switch 290 is actuated by lever 258 through adjustable screw 292. Lever 258 also controls cam valve 254 through adjustable screw 294. Spring and pin means 296 bias lever 258 to the position shown in FIG. 17. The tripping point of limit switch 290 can be adjusted by adjustment of the relative position of screw 292. After indexing arm 276 has been raised, the complete indexing cycle is then controlled hydraulically.

Figure 19:
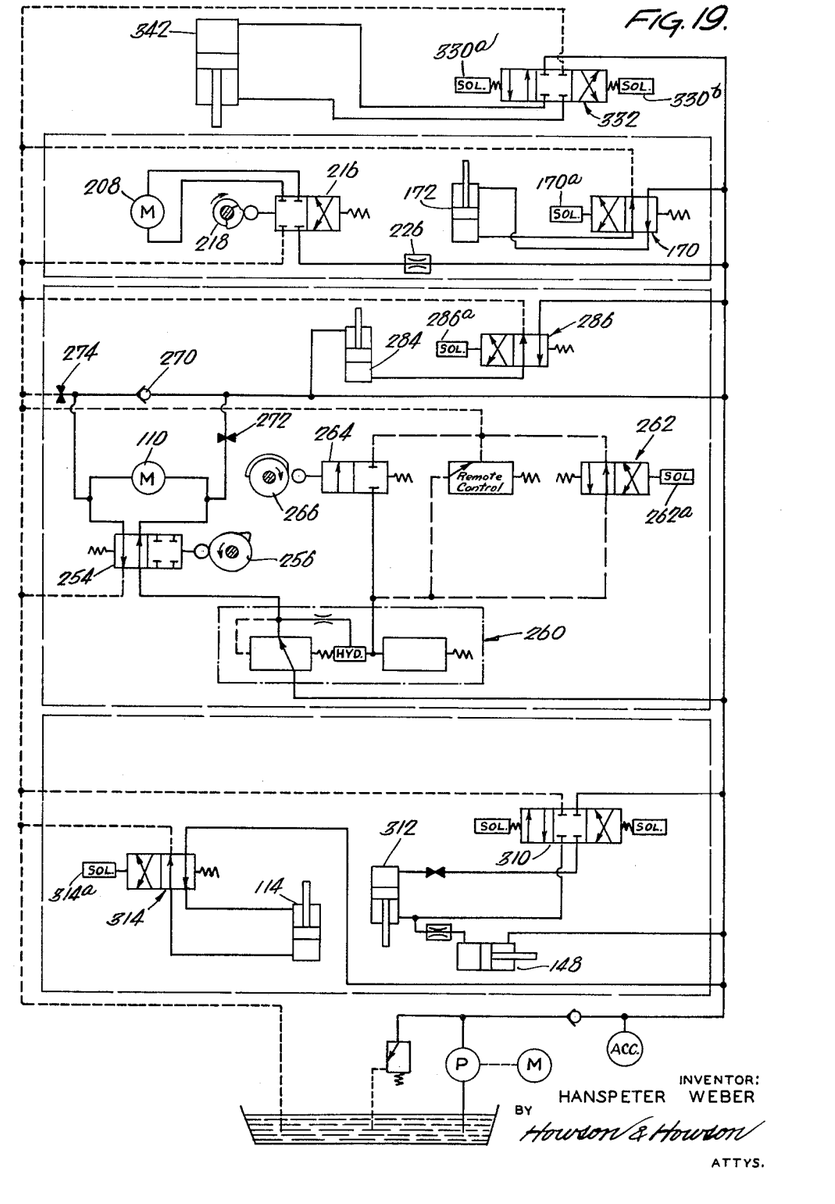
FIG. 19 is a schematic hydraulic control circuit for the mechanism.
Figure 20:
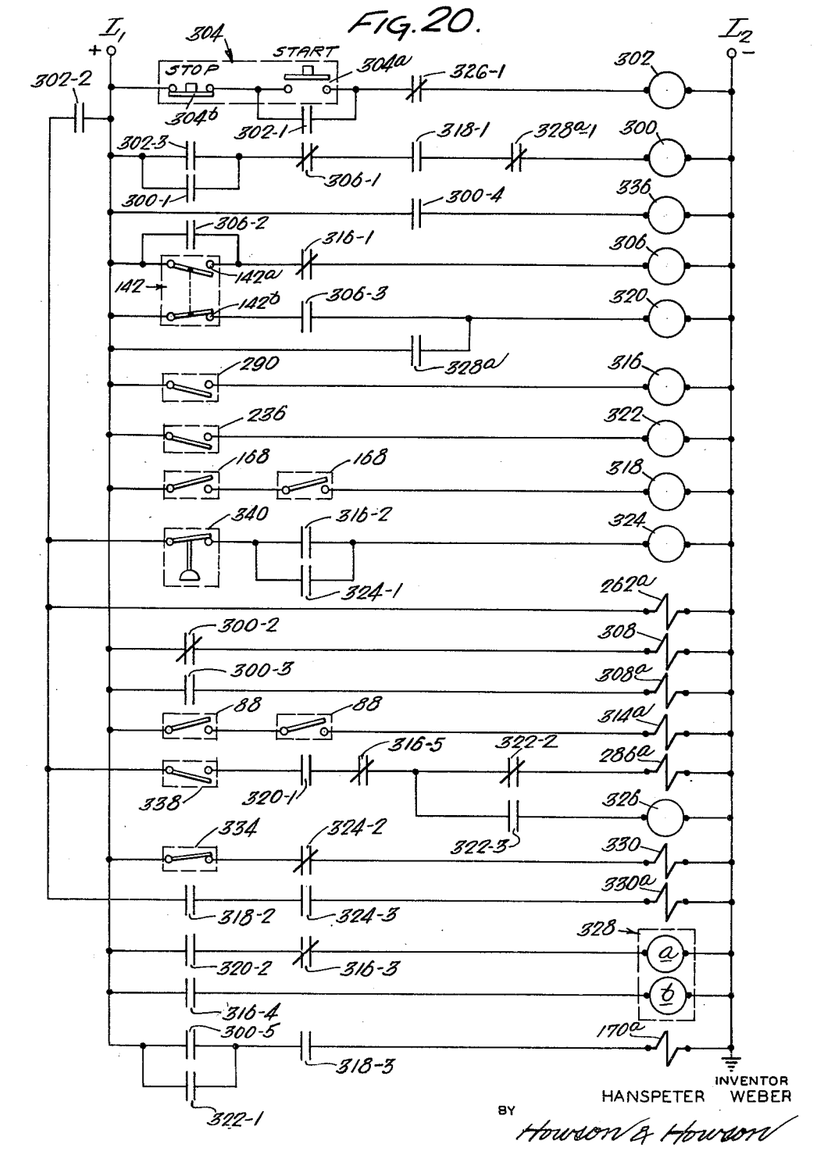
FIG. 20 is a schematic electrical control circuit for the mechanism.

While various systems of sequence control might be employed to effect continuous cyclic operation and synchronism of the various components of the hydraulic system schematically shown in FIG. 19, one such method of control is schematically illustrated in FIG. 20. This embodies an electrical system which, when activated by the usual start circuit, initiates operation of the machine and the various sequences are conducted in timed relation to each other. It will be seen, however, that sequential operation progresses only as long as effective interlocks are made, and should a condition arise resulting in faulty performance of the machine, the machine will shut down automatically until the cause of such failure is remedied.

The electric circuit is so designed that certain operations are completed after the stop button is actuated. This results in a simplified circuit and does not require memory devices. No danger to operating personnel is created by the operations completed after the machine is stopped.

During idling of the machine, since the intermittent motion drive always brings the feeder bars 98 to a stop in the indexed position (FIG. 18), the limit switches 168, 168 are held closed which energizes relay 318.

Figure 13:
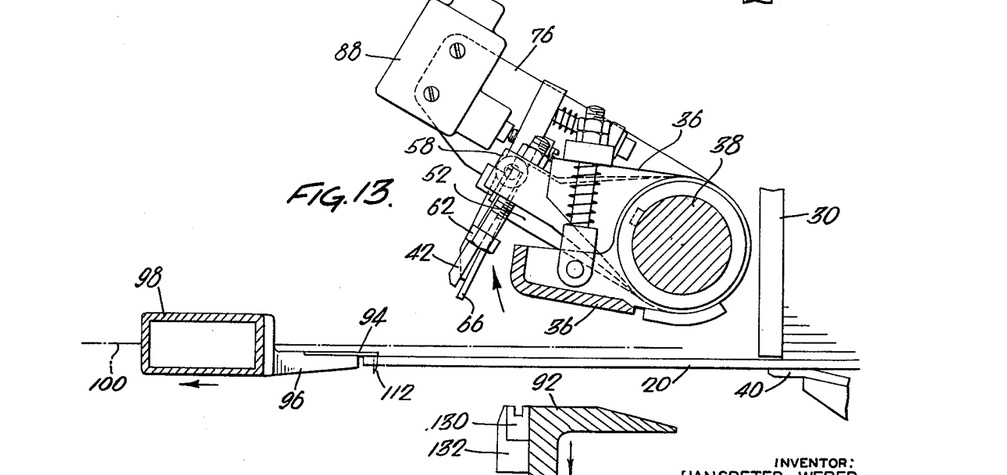

Relay 300 is de-energized, which energizes solenoid 308 of valve 310 through the normally closed contact 300—2. This keeps the register gate in "up" position (FIG. 13).

Relay 324 is de-energized, which energizes solenoid 330 of valve 332 to bring the platen table 150 to the "up" position. This "up" position is determined by limit switch 334 which is actuated by a cam 151 mounted on platen table 150 (FIG. 21).

Referring now to FIGS. 19 and 20, a conventional start-stop switch is incorporated in the circuit. $L_1$ and $L_2$ designate line connections. When start switch 304 is actuated, relay 302 is energized through the normally closed stop contact of switch 304 and held in by start contact 302—1. This energizes relay 300, energizing solenoid 308a, and de-energizing solenoid 308, of valve 310, simultaneously lowering the register gate and associated devices through hydraulic cylinder 312, as the bottom sheet or blank in the magazine is fed into the machine. Upon reaching the register gate position where it is brought to rest, sensing switches 88, 88 in series with operating solenoid 314a of the valve 314, detect the presence of the sheet or blank, and also whether it is properly aligned for the transfer operation immediately to follow. These switches are single pole, double throw and if they are closed by the presence of a properly aligned blank, the solenoid 314a will be energized to actuate the valve 314. This results in operation of the pusher bar 92 through hydraulic cylinder 114 to impinge the sheet, thus presented, upon the tines of the feeder bar 98. Conversely, if a sheet is not so presented, but comes to rest in a position askew or out of position for proper registry with the conveyor bar, the machine comes, automatically, to a stop, since solenoid 314a is not energized. In this case, a signal light (not shown) is illuminated through time delay relay 336 which is a slow closing relay. This is accomplished by energizing time delay relay 336 by contact 300—4. If relay 300 remains energized for several seconds, which means that the sheet or blank is not positioned properly, the time delay relay 336 will close and the signal light is illuminated. This relay 336 could also be used to interrupt the cycle of the machine by de-energizing relay 302. However, it has been found desirable not to do so since in most cases it is possible to advance the bottom sheet a little further by hand to bring it into perfect registered position and thus continuing operation of the machine.

Actuation of the pusher bar 92 to complete the transfer operation results in closing contacts 142a of switch 142 which energizes relay 306 which is held in by contact 306—2. When relay 306 is energized, the normally closed contact 306—1 opens and de-energizes relay 300 which results in energizing solenoid 308, and de-energizing solenoid 308a of valve 310 to effect elevation of the register gate. Elevation of the register gate removes sensing switches 88, 88 from contact with the blank, resulting in de-energization of solenoid 314a with subsequent reversal of valve 314, and return of pusher bar 92 to its lower position. The normally closed contacts 142b of switch 142 with the pusher bar in its lower position, completes a circuit to energize relay 320. Contact 320—2 of relay 320 energizes the mechanically latch type relay 328 which is used as a memory to store the information that one sheet has been fed in and impinged into the tines. In case the machine is stopped during the so far described sequence of the machine, all the operations described will be completed. If the operation is resumed (no matter if the machine has been shut off altogether or only stopped by actuating stop switch 304) relay 328 will start the cycle at the correct point, by preventing relay 300 from being energized and closing the circuit of relay 320.

If the operation is not stopped, contact 320—1 of relay 320 energizes solenoid 286a of valve 286 to lift cylinder 284 to permit rotation of the drive shaft for indexing the conveyor and advance the sheet or blank. Solenoid 286a is only energized if all the other interlocks are cleared, such as limit switch 338 and the contact 322—2 of relay 322. Limit switch 338 is actuated by a cam 153 (FIG. 21) on the platen table and insures that the platen table is in the raised position to permit conveyor bar 98 to pass without touching.

Simultaneously with lowering of the register gate, contact 300–5 of relay 300 also energizes solenoid 170a of valve 170 to actuate cylinder 172 to effect the stripping off of the outgoing sheet from the tines of its conveyor bar at the delivery end of the machine, and to feed the thus freed sheet from the machine.

In case no sheet is at the delivery station when the machine is started up, the solenoid 170a is kept energized only as long as relay 300 is energized. If a sheet is present at the delivery station, limit switch 236 detects the presence of the freed sheet and energizes relay 322, which keeps solenoid 170a energized through contact 322–1 until the sheet is completely delivered. In case the freed sheet is not delivered fast enough or gets jammed, limit switch 236 keeps relay 322 energized. As a result, the normally closed contact 322–2 of relay 322 prevents solenoid 286a from being energized. The normally open contact 322–2 however, energizes relay 326 which interrupts the cycle by de-energizing relays 302. Machine operation may be resumed by actuation of the start button of switch 304 after removing the jammed blank and thus releasing limit switch 236 and de-energizing relay 322.

The limit switch 290 which is operated during indexing by the index mechanism, energizes relay 316 temporarily. As a result, relay 306 and relay 328a are de-energized. Relay 306 de-energizes relay 320, which de-energizes solenoid 286a for reversing valve 286 to reset the mechanism for stopping the conveyor in its next indexed position. Contact 316–4 of relay 316 energizes relay 328b to reset the mechanically held relay 328. Contact 316–2 of relay 316 energizes relay 324 through the normally closed contacts of pressure switch 340. Relay 324 is held in by contact 324–1. Relay 324 being energized, a blank is transported into cutting position, which closes the contact 324–3. The conveyor coming to rest after an incremental indexing, the limit switches 168, 168 close and energize relay 318. Contact 316–5 is a resetting mechanism for mechanical stop controlled by solenoid valve 286a. If the machine is stopped during indexing, the pressure in the hydraulic system is instantly reduced to zero and indexing is complete at slow speed. Contact 318–2 of relay 318 closing, energizes solenoid 330a of valve 330, resulting in moving the platen table down by means of hydraulic cylinder 342, and cutting the blank. Relay 318 also starts the cycle of feeding a new blank into the machine and simultaneously delivering the cut blank at the delivery end of the machine. When the required cutting pressure in the hydraulic cylinders (not shown) is reached, pressure switch 340 is actuated, thus opening the normally closed contact and de-energizing relay 324, which results in de-energizing solenoid 330a and energizing solenoid 330 of valve 332. This results in bringing the platen table 150 to the "up" position and the cycle repeats.

Whenever a double solenoid is used, as shown in FIG. 19, there is always a pair of contacts of the same relay employed, one normally open, the other normally closed as shown in FIG. 20, using reference characters corresponding to the relays, to avoid energizing both relays at the same time in case of a failure or malfunctioning of any component.

Since the machine stops, but does not interrupt the electric cycle, when a blank does not trip the limit switches 88, 88 (which is also the case when no sheet or blank is fed at all) the machine can be fed by hand very easily. The machine adapts itself to any speed, and whenever a blank is fed the machine will feed and cut it, no matter at what intervals the blanks are fed, not exceeding maximum speed of machine of course. Feeding by hand might be desirable on odd shaped blanks or very excessively warped blanks.

While a specific embodiment of one form of the invention has been shown and described in detail hereinabove, manifestly minor variations in structure can be effected and variations in the specific control circuits shown can be made without departing from the spirit and scope of the invention as defined in the appended claims.

I claim:
1. In a machine for performing working operations on blanks of material in successive stages at a plurality of spaced working positions, blank transfer means for sequentially and intermittently feeding blanks to and away from a work station, blank work means at said station for intermittently performing a work operation on a said blank in timed sequence with movement of said blank transfer means, blank discharge means for disengaging said blank at a discharge station and intermittent motion drive mechanism to start and index movement of said blank transfer means and stop the same automatically in timed sequence with the work stroke of said blank work means, means for selectively controlling the time cycle of intermittent movement by changing the rate of acceleration and thereby deceleration of movement without changing the work stroke time of the machine, said fluid motor being connected in a hydraulic circuit, pressure to said motor being variable whereby the rate of acceleration and deceleration of the drive means can be varied.

2. In a machine as claimed in claim 1, a plurality of blank engageable means positioned at said plurality of spaced working positions, said blank engageable means being operable for inactivating said drive mechanism and said blank work means in the absence of a blank at said working positions or when a blank is improperly positioned at said working positions.

3. In a machine as claimed in claim 2, said blank transfer means including spaced parallel continuous chains, spaced blank gripper means secured to said chains adapted to engage a leading edge of a said blank for transfer thereof through said machine upon movement of said chains, a limit switch positioned in the path of movement of said gripper means following said discharge station and operable upon contact by a said gripper means to actuate said discharge means.

4. In a machine as claimed in claim 3, sensing means at said discharge station for sensing the presence of a blank operable for initiating actuation of said discharge means.

5. In a machine as claimed in claim 4, said sensing means comprising a switch means including a rotatable cam with a nose portion contactable by a blank passing thereover, rotation of said cam by a sheet continuing actuation of the discharge means and additionally indicating absence of a sheet or an improperly presented sheet to deenergize the machine.

6. In a machine for performing working operations on blanks of material in successive stages at a plurality of spaced working positions, blank transfer means for sequentially and intermittently feeding blanks to and away from a work station, blank work means at said station for intermittently performing a work operation on a said blank in timed sequence with movement of said blank transfer means, blank discharge means for disengaging said blank at a discharge station and intermittent motion drive mechanism to start and index movement of said blank transfer means and stop the same automatically in timed sequence with the work stroke of said blank work means, said intermittent motion drive mechanism including a fluid powered motor, and electrically and cam controlled fluid control valves operable upon initial energization of said mechanism to automatically control operation of said fluid powered motor through the various cycles of intermittent operations thereof, means for selectively controlling the time cycle of intermittent movement and standstill of said mechanism and the rate of acceleration and deceleration of movement without changing the entire time cycle of the machine, said fluid motor being connected in a hydraulic circuit, pressure to said motor being variable whereby the rate of acceleration and deceleration of the drive means can be varied, a stack of blanks being positioned at the entrance end of said machine, and kick feed means operatively associated therewith, register gate means positioned adjacent the stack and engageable by a blank fed from a stack thereof, switch means operable by said register gate means only upon proper presentation of a blank thereto to actuate said blank transfer means to engage a blank and initiate operation of said drive mechanism.

7. In a machine as claimed in claim 6, said last named switch means preventing operation of said machine if a sheet is improperly presented to said register gate means.

8. In a machine as claimed in claim 7, deflector plate means adjacent said register gate operable to deflect the leading edge of a blank being fed, said deflector plate means being pivotally mounted and movable upon actuation of said switch means by said gate to elevate or rotate away from and free the leading edge of a blank.

9. In a machine as claimed in claim 8, switch means operable by said work means to inactivate said drive mechanism during a working stroke and prevent movement of said transfer means.

References Cited by the Examiner
UNITED STATES PATENTS

| | | | |
|---|---|---|---|
| 555,422 | 2/96 | Van Benthuysen | 271—50 |
| 704,058 | 7/02 | Lilly | 271—44 |
| 1,212,242 | 1/17 | Novick | 271—46 X |
| 1,286,714 | 12/18 | Moore | 271—50 X |
| 1,342,187 | 6/20 | Smith | 271—82 |
| 1,715,141 | 5/29 | Mathieson | 198—135 X |
| 2,226,674 | 12/40 | Seybold | 271—79 |
| 2,258,880 | 10/41 | Bobst | 271—50 |
| 2,362,736 | 11/44 | Weiss | 101—227 X |
| 2,402,777 | 6/46 | Rose et al. | 198—135 X |
| 2,657,052 | 10/53 | Elliott | 271—79 |
| 2,722,417 | 11/55 | Nitchie | 271—50 |
| 2,737,388 | 3/56 | Gottscho | 271—35 |
| 2,747,346 | 5/56 | Tigerman | 198—135 X |

ROBERT B. REEVES, *Acting Primary Examiner.*

ROBERT A. LEIGHEY, ROBERT E. PULFREY, RAPHAEL M. LUPO, *Examiners.*